July 31, 1923.

M. J. DUFFY

RESILIENT WHEEL

Filed June 10, 1920

1,463,682

WITNESSES
Frederick Diehl.

INVENTOR
MICHAEL J. DUFFY
BY
ATTORNEYS

Patented July 31, 1923.

1,463,682

UNITED STATES PATENT OFFICE.

MICHAEL JOHN DUFFY, OF BROOKLYN, NEW YORK.

RESILIENT WHEEL.

Application filed June 10, 1920. Serial No. 387,920.

*To all whom it may concern:*

Be it known that I, MICHAEL J. DUFFY, a citizen of the United States, and resident of the city of New York, borough of Brooklyn, county of Kings, and State of New York, have invented a new and Improved Resilient Wheel, of which the following is a full, clear, and exact description.

It is well understood that numerous resilient wheels have been proposed with a view of permitting of the elimination of a pneumatic tube, which is always subject to punctures and other defects.

These attempts heretofore made, have for the most part proven impractical, in that the parts of the wheel when once assembled, were not fully protected against the action of grit or dust particles, or if this were the case, the parts when once assembled would be inaccessible for adjustment and oiling.

A further defect which has been experienced in connection with wheels of this type, has been that in that type employing springs, the springs themselves have had to take up all of the shock which was liable to act in a detrimental capacity, when severe unevenness in the surface to be traveled was encountered.

With this in view, I have constructed a resilient wheel, and more particularly a wheel pertaining to that type employing springs, by means of which a conventional solid rubber tire may be used to advantage, with the result that none of the objections incident to the utilization of a pneumatic tube are experienced.

A further object of my invention is the construction of a resilient wheel in which the parts will at all times be accessible for inspection, adjustment and oiling, and in which these parts will be so arranged that danger of detrimental action incident to grit, sand, etc., working into the moving parts of the wheel are eliminated.

Figure 1:
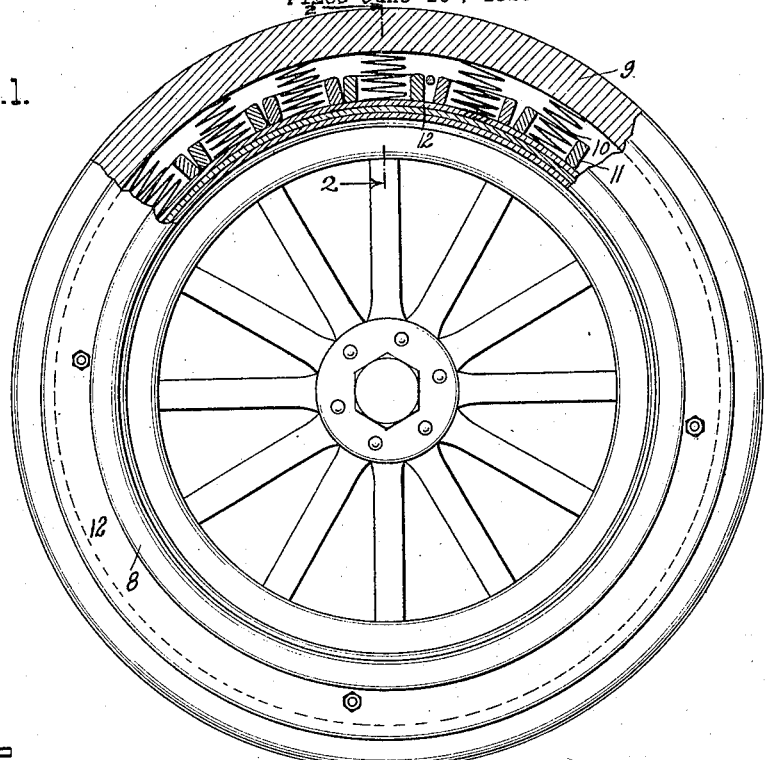

Reference is had to the attached sheet of drawings as illustrating one practical embodiment of my invention, and in which drawings, Figure 1 is a partly sectional side view of a resilient wheel constructed in accordance with my invention.

Figure 2:
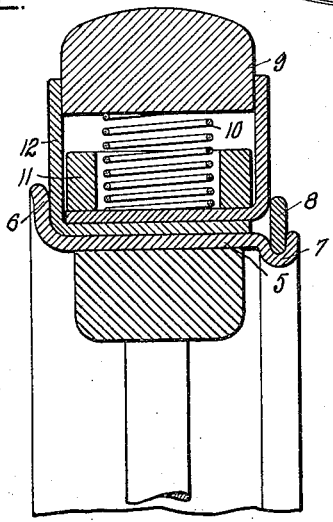
Figure 3:
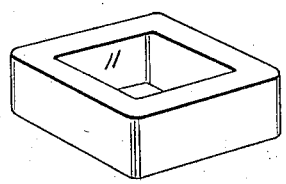

Figure 2 is an enlarged sectional view taken along the lines 2—2 of Figure 1, and Figure 3 is a perspective view of a certain detail of construction forming a part of my invention.

In these views the reference numeral 5 indicates any desired type of felly, which has one of its edges upturned as at 6 to provide a retaining wall, its opposite edge being formed with a groove portion 7 adapted to receive a removably split retaining ring 8 also serving as a retaining wall.

With a view of providing resiliency, a contact member conveniently including a conventional solid rubber tire 9 is used, which tire is arranged concentrically with respect to the felly 5. Bearing against the under side of this tire is a spring of any desirable type, such as a coil spring 10, the lower end of which is encircled by a rubber cushioning element 11 of any desired contour, such as quadrangular, as has been illustrated in Figure 3.

To provide convenient means whereby the parts aforedescribed may readily be accessible, and by means of which a sufficiently dust proof mounting will be provided, therefore, a pair of L shaped ring members 12 have their base portions interposed between the inner ends of the springs 10, and upper face of the felly 5, movement on the part of these members being prevented when the device is in assembled position, by means of the split ring 8. It is now to be noted that the inner faces of the side walls of the ring shaped members 12 will bear against the side edges of the tire 9, thus acting as a guide for the same, and reducing the possibility of grit working into the space existent between the under side of the tire 9 and the upper face of the uppermost ring shaped member 12 to a minimum.

It will readily be appreciated however, that the parts may be removed in the manner of a conventional rim with an inflated tire mounted therein, and that a removal of the split ring 8 will permit of the withdrawal of the entire ensemblage from the felly 5.

In operation it will now be understood that the springs 10 will serve to absorb the ordinary shocks incident to travel, but that should the wheel be subjected to severe jars the inner face of the tire 9 will contact with the upper edge of the cushioning element 11, which, although affording a resilient contact will greatly enhance the resistance afforded by the spring 10 aside from the fact that this member acts as a confining agent and guide for the spring.

It will be further understood that by this construction, I have provided a resilient wheel which shall be as nearly as possible free from the danger of foreign matter entering the working parts of the same, and in which these parts will be accessible should this be desired.

Obviously numerous modifications of structure might readily be resorted to without in the least departing from the scope of my claim, which reads as follows:

Having thus described my invention, what I claim as new and desire to secure by Letters Patent is as follows:—

A resilient wheel comprising in combination with a wheel body and its felly band, a plurality of members substantially L-shaped in cross section adapted to interengage each other to form a channel, a plurality of blocks mounted in the base of said channel, said blocks each having a centrally disposed open portion, a resilient member mounted in the open portion of each of said blocks, a resilient tread element mounted on said resilient members, and means carried by the felly band for maintaining said substantially L-shaped members in the channel-forming position.

MICHAEL JOHN DUFFY.